June 21, 1949.  E. P. BULLARD, III  2,473,506
POSITIONING DEVICE
Filed Jan. 6, 1945  4 Sheets-Sheet 1

INVENTOR
Edward P. Bullard, III
By
ATTORNEY

June 21, 1949.　　　　E. P. BULLARD, III　　　　2,473,506
POSITIONING DEVICE

Filed Jan. 6, 1945　　　　　　　　　　　　　4 Sheets-Sheet 2

INVENTOR
Edward P. Bullard, III
By Paul M. Grist
ATTORNEY

June 21, 1949.  E. P. BULLARD, III  2,473,506
POSITIONING DEVICE
Filed Jan. 6, 1945  4 Sheets-Sheet 3
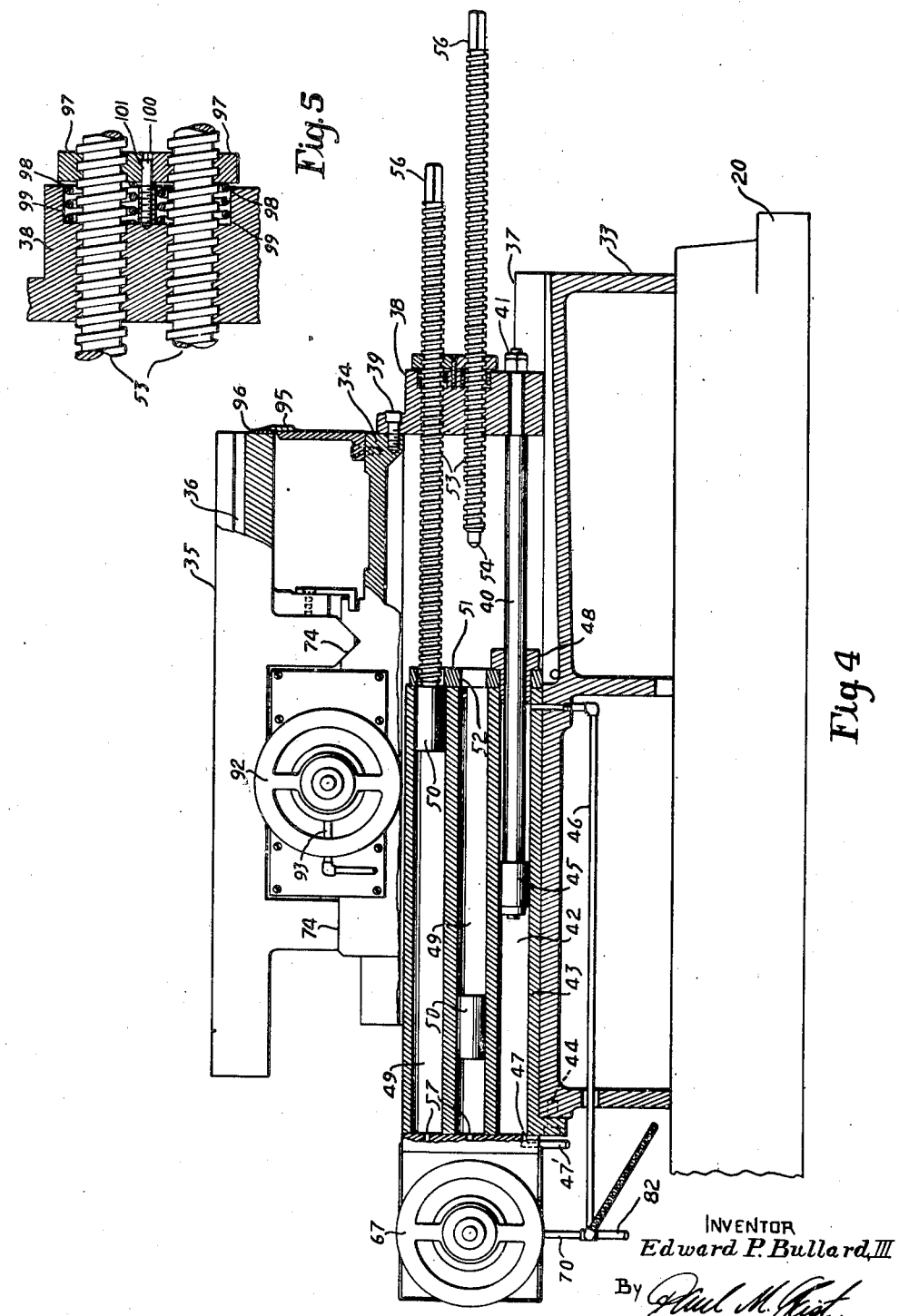
INVENTOR
Edward P. Bullard, III
By
ATTORNEY June 21, 1949.  E. P. BULLARD, III  2,473,506
POSITIONING DEVICE
Filed Jan. 6, 1945  4 Sheets-Sheet 4
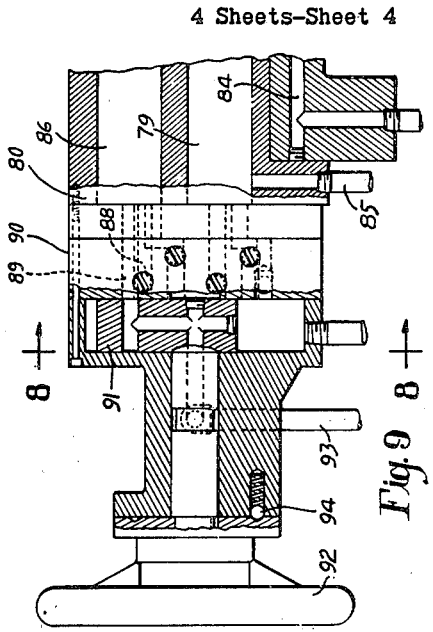
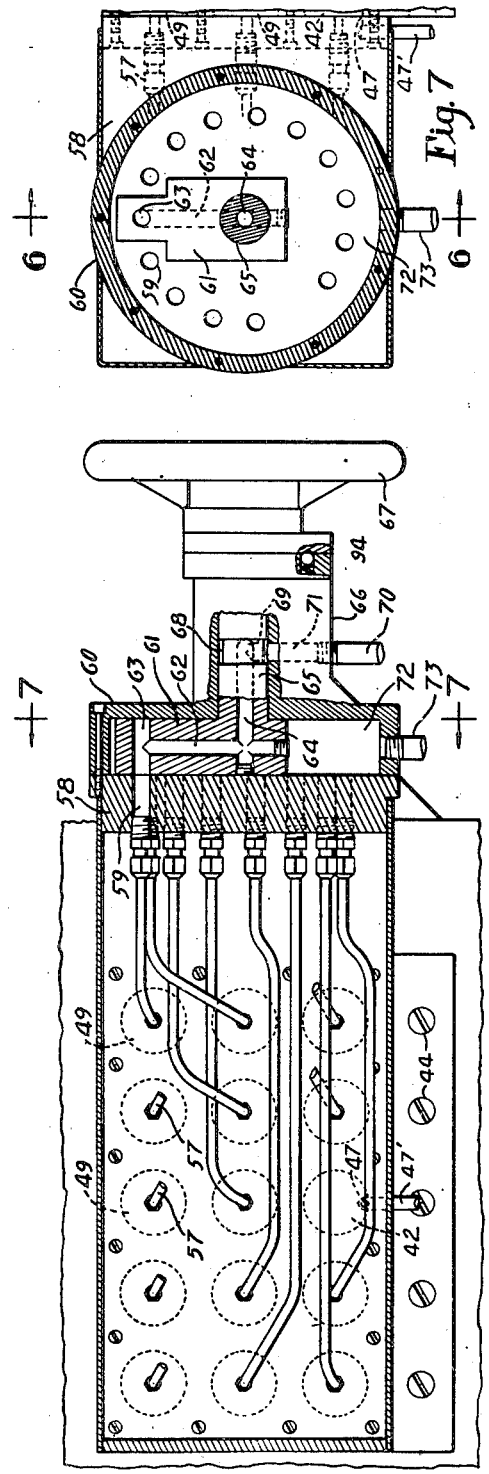
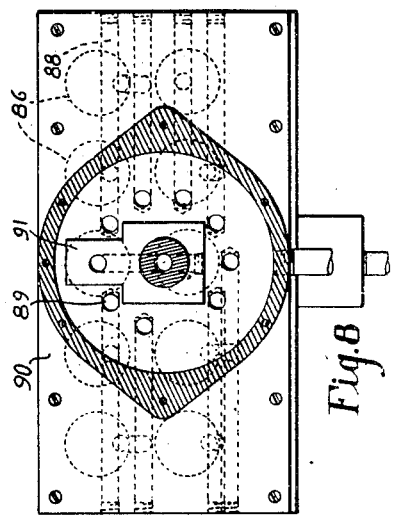
INVENTOR
Edward P. Bullard, III
BY
ATTORNEY Patented June 21, 1949

2,473,506

UNITED STATES PATENT OFFICE 2,473,506

POSITIONING DEVICE

Edward P. Bullard, III, Fairfield, Conn., assignor to The Bullard Company, a corporation of Connecticut Application January 6, 1945, Serial No. 571,637

31 Claims. (Cl. 60—97)

This invention relates to machine tools, and particularly to apparatus for eliminating the use of jigs in the machining of metal work.

Jigs are commonly employed to accurately locate and guide a tool during a metal working operation. Machine tools with which jigs are commonly employed are constructed so that the tool and work are moved relatively to each other in one plane to properly position them for a machining operation; and moved relatively to each other in another plane to produce the desired machining operation. The former of these movements is independent of the actual removal of metal as distinguished from lathes and milling machines where the relative positional change between the tool and work actually removes metal from the work. Accordingly, this relative positional change movement for locating the tool and work may be unrestricted as regards its reaching the predetermined location, whereas the same sort of movement in lathes and milling machines must be closely controlled and restricted to specific paths because metal is actually being machined during such relative movement.

The principal object of this invention is to provide apparatus that will eliminate the use of jigs during metal working operations.

Another object of this invention is to provide apparatus that can set up a condition of fluid stable equilibrium of a member at a plurality of predetermined accurate points along one or more paths of its movement. In the present invention, a condition of stable equilibrium for any point of a member along any of its paths of motion means that the member will instantly move to that point regardless of its previous location, and will immediately return to that point if displaced from it by some external force when such condition for that point exists.

Other objects of the invention include the provision of an apparatus capable of setting up a condition of stable equilibrium at a plurality of very accurately predetermined points in the path of travel of a member by simply moving a hand lever to any one of a plurality of positions in any order; the provision of such an apparatus wherein the movement of the hand lever is not proportional to the amount of movement of the member being moved; the provision of such an apparatus that is infinitely flexible and adapted readily to be pre-set for causing a plurality of successive substantially instantaneous relative movements between a work support and a tool for any desired positional arrangement thereof; the provision of such an apparatus including an opposed fluid-operated differential piston mechanism for substantially instantly providing the relative movement between the work and tool supports; the provision of such an apparatus wherein each stopping of the relative movement at each location is cushioned by the fluid medium; and the provision of such an apparatus wherein its accuracy is dependent upon the pressure of the fluid and independent of the volumetric change of fluid so that the accuracy of the device is not impaired by leakage so long as the pressure is maintained constant.

Another object of the invention includes the provision of an apparatus capable of governing repetitious positioning of a member at different locations along one or more paths, wherein instantaneous positional selection at the will of the operator, and movement of the member along the shortest path to the selected location can be effected regardless of the previous location of the member.

The above, as well as other objects and novel features of the invention will become apparent from the following specification and accompanying drawings, in which:

Figure 4 is an elevational view taken along line 4—4 of Figure 2, parts being broken away to show others;

Figure 5 is an enlarged detail view of part of the apparatus shown in Figures 2 and 4;

Figure 6 is a sectional elevational view of part of the control means as viewed substantially along line 6—6 of Figures 1 and 7;

Figure 7 is a sectional elevational view substantially along line 7—7 of Figure 6;

Figure 8 is a sectional elevational view substantially along line 8—8 of Figure 9; and Figure 9 is an enlarged view of part of the control means of Figure 2.

Figure 1:
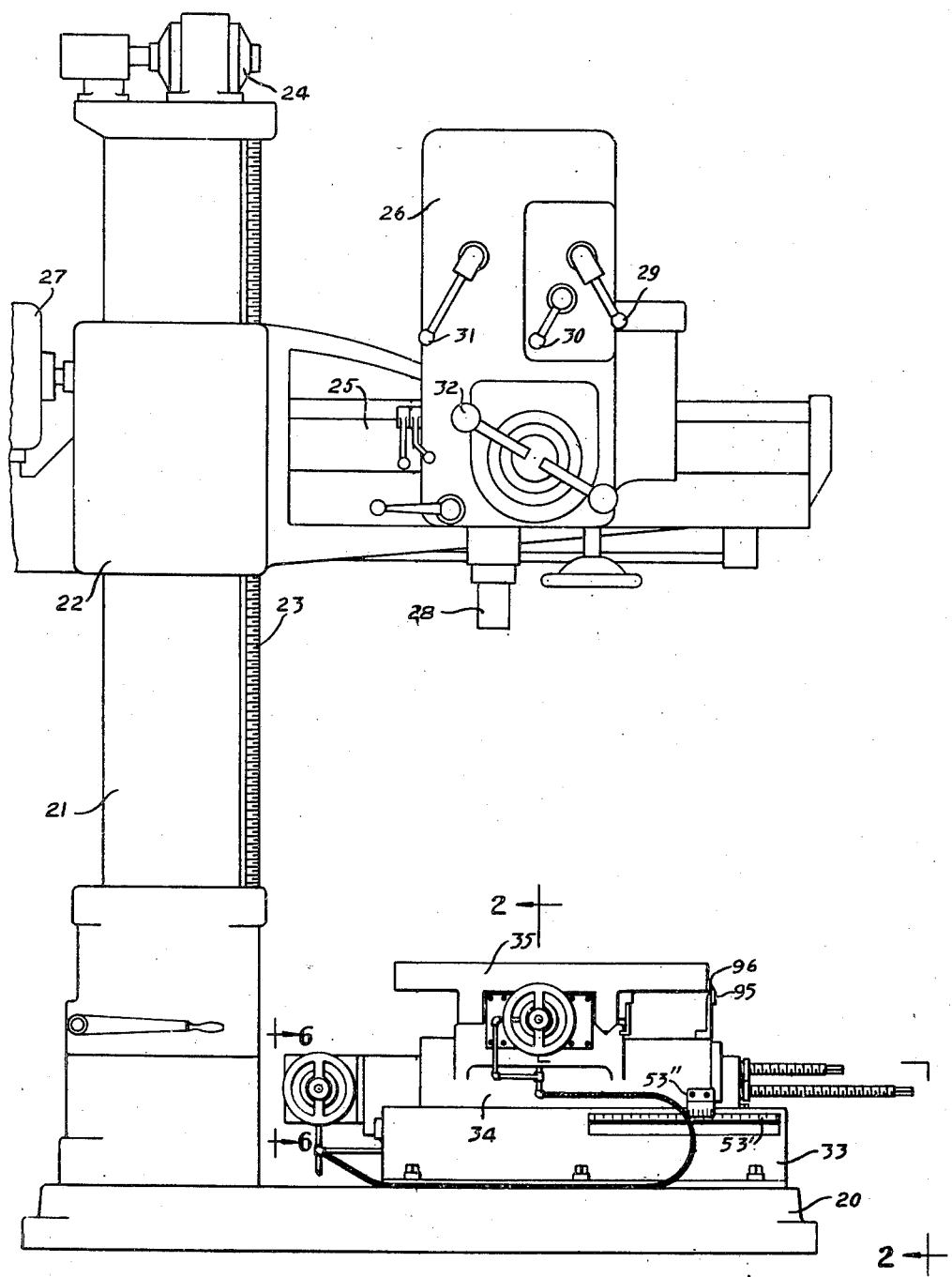
Figure 1 is a front elevational view of a radial drill to which the principles of this invention have been applied.

Although the principles of the invention may be applied to any apparatus wherein it is desired to move a member along a plurality of paths in the same or different planes, they are shown and will be described as applied to a radial drill comprising a base 20 (Fig. 1) having a standard 21 rigidly secured to it. A saddle 22 is mounted on the standard 21 for vertical reciprocation, but fixed against angular movement. A screw 23, mounted for free rotation along the standard 21, is threaded into the saddle 22 so that its rotation causes vertical movement of the saddle. A reversible electric motor 24 is located at the top of the column 21 and is suitably geared to the top of the screw 23.

The saddle 22 includes a cantilever arm 25 that supports a slide 26 for movement therealong. The slide 26 is adapted to be moved along the arm 25 in a conventional manner through the operation of a motor 27 mounted on the saddle 22. The slide 26 supports a spindle 28 adapted to be rotated at a plurality of speeds by a feedworks transmission located within a housing attached to slide 26. The feedworks transmission may be of any conventional design such as, for example, that shown in Patent No. 1,763,713, granted to D. C. Klausmeyer on June 17, 1930. Hand levers 29, 30 and 31 are provided for setting up various gear combinations within the feedworks for rotating spindle 28 at the plurality of different rates of rotation of which it is capable for performing different metal working operations. Hand lever 32 is provided for moving the spindle 28 in a vertical direction for effecting the metal working operations. The foregoing structure is of conventional design and forms no part per se of the present invention.

A work-supporting base member 33 is rigidly bolted to the base 20 of the radial drill. It supports a carriage 34 for movement in two directions along a single path. The carriage 34 supports an additional carriage 35 for movement in two directions along a path at right angles to the path of movement of the carriage 34. The carriage 35 is provided with a series of T-slots 36 (Fig. 2) for facilitating the attachment of work to it. Accordingly, the carriage 35 and work can be moved universally within a plane at right angles to the axis of the spindle 28 so that any point of the work may be located beneath the spindle.

Referring to Figure 4, the base member 33 is provided with ways 37 along which the carriage 34 is adapted to be moved. The carriage 34 includes a depending member 38 that is rigidly bolted to it by screws 39. A connecting rod 40 is rigidly attached to the depending member 38 by a nut 41 and extends into a cylinder 42 of a housing 43 rigidly secured by screws 44 to the base member 33. The connecting rod 40 is provided with a piston 45 that is adapted to be reciprocated within the cylinder 42. Fluid under constant pressure, which in the present instance is oil, is adapted to be supplied to the cylinder 42 through a line 46 that is connected to the cylinder 42 on the righthand side of the piston 45, as viewed in Figure 4. The lefthand end of cylinder 42, as viewed in Figure 4, is provided with an air vent 47 which also permits the escape of any liquid that should leak past the piston 45 through a line 47' to an oil sump. The end of the cylinder 42, opposite that containing the vent 47, is provided with a stuffing box 48 to prevent leakage of the liquid therefrom. The construction and arrangement of the parts are such that liquid under pressure is supplied to only one side of piston 45 and, therefore, it can move carriage 34 in only one direction along ways 37. Movement of carriage 34 in the opposite direction is occasioned by mechanism to be described later.

The housing 43 also includes a plurality of cylinders 49 in each of which a floating piston 50 is provided. There may be any number of cylinders 49, depending upon the number of possible different points along ways 37 that it may be desirable to locate the carriage 34 within a cycle of operation. In the present instance, there are fourteen cylinders 49, each having its respective floating piston 50 therein. The length of the cylinders 49 is substantially the same as the length of the cylinder 42. Each of the cylinders 49 on the righthand side of the housing 43, as viewed in Figure 4, cooperates with a datum plate 51 including openings 52 aligned with, but of less diameter than the respective cylinders 49. Accordingly, the admission of pressure to the lefthand side of the cylinders 49 (Fig. 4) will move the floating pistons therein rightwardly until they abut against the datum plate 51. The diameter of the openings 52 in the datum plate 51 is large enough to freely admit the lefthand end of adjustable screws 53, one for each of the cylinders 49. The end of each screw 53 which cooperates with the one end of the floating pistons 50 is provided with a tapered portion 54 that is adapted to guide it into a socket 55 (Fig. 2) in its respective floating piston 50 for a purpose to be described later. Each of the screws 53 threads into the depending member 38 that is fixed to the carriage 34, and each is provided with a square end portion 56 for receiving a wrench so that each screw 53 can be accurately adjusted to locate its end 54 at any pre-determined point.

Each of the cylinders 49 is adapted selectively to be supplied with liquid under pressure through ducts 57 at their ends opposite those adjacent the datum plate 51. The pressure of the liquid admitted to the cylinders 49 is equal to the pressure of the liquid admitted to the cylinder 42. However, the effective area of the pistons 50 is twice that of the piston 45 so that the floating piston 50 in any selected cylinder 42 will always be forced against the datum plate 51 in opposition to the force developed by the pressure liquid acting on the piston 45. There is, therefore, a relatively severe abutting engagement between the ends 54 of the screws 53 and their respective pistons 50. In order to prevent bending of the screws 53 due to this abutting action, the socket 55 (Fig. 2) receives the end 54 of the screws 53 and provides a rigid support preventing any bending or dislocation of the screws 53. The combination of the pistons 45, 50, datum plate 51 and adjustable screws 53 forms a differential piston device that sets up a condition of fluid stable equilibrium of the carriage 34 at any point along the ways 37 which can accurately be located by adjusting the selected screw 53 with the aid of fixed and movable vernier scales 53' and 53''.

Referring to Figures 6 and 7, each cylinder 49 is provided with a separate duct 57 leading to a manifold plate 58 that includes a plurality of passages 59 arranged in a circle, one for each duct 57 and to each of which a coupling for its respective duct 57 is threaded. A valve housing 60 is rigidly attached to the manifold plate 58 and supports a rotatable valve 61. The valve 61 includes a port 62, the one end of which communicates with a passage 63 at right angles thereto and at a radial distance from the center of rotation of the valve 61 equal to the radius of the circle including the passages 59 in the manifold plate 58. The opposite end of passage 62 communicates with another right-angularly-disposed passage 64 that extends outwardly into a shaft 65 integral with the valve 61. The shaft 65 is journaled in a boss 66 forming part of the valve housing 60 and a handwheel 67 is fixed to its outer extremity.

A circumferential groove 68 is formed in the periphery of the shaft 65 and a drilled passage 69 extends radially from the end of duct 64 outwardly to the groove 68. Liquid under pressure is adapted to be admitted through a supply line 70 that is in communication with a duct 71 in the boss 66 leading to the groove 68 in the shaft 65. Accordingly, liquid under pressure passing through the line 70 is admitted to the passages 64, 62 and 63. Rotation of the handwheel 67 causes the passage 63 to be moved about the series of passages 59 within the manifold 58 so that the valve 61 can be positioned in cooperative relation with any of these passages at the will of the operator. Suitable indices may be provided in conjunction with the handwheel 67 for identifying the location of the valve 61 with regard to the various passages 59 in the manifold 58. The housing 60 also includes an exhaust chamber 72 to which is connected an exhaust line 73 for permitting the free exhaust of all passages 59, and consequently all cylinders 49 except the one in cooperative relation with the valve 61. From the foregoing it is evident that an operator need merely rotate the handwheel 67 to any selected position to cause the carriage 34 to move to the desired point dictated by the setting of the screw 53 for that position.

Figures 2, 3:
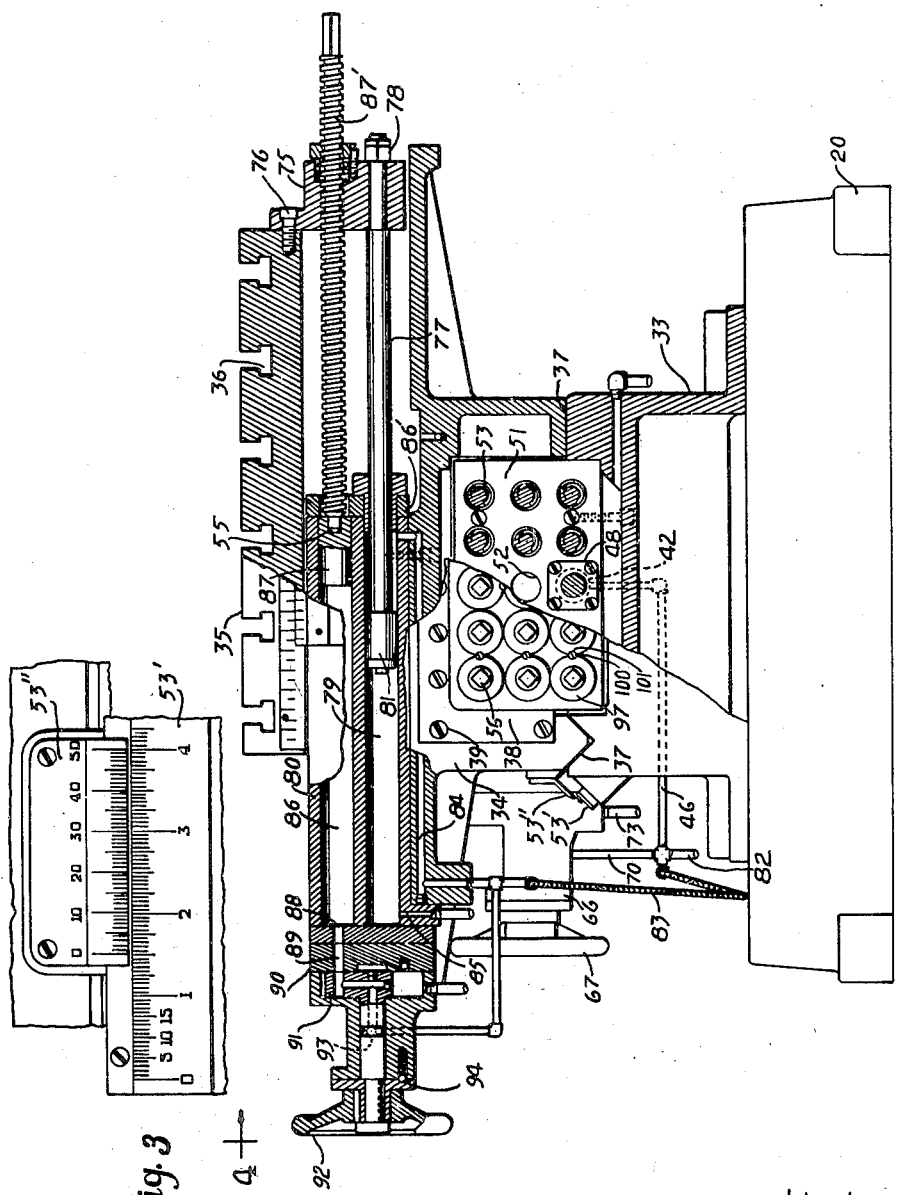
Figure 2 is a sectional elevational view taken substantially along line 2—2 of Figure 1.
Figure 3 is a detail of the lower vernier shown in Figure 1.

The carriage 35 is adapted to be moved in two directions along ways 74 formed on the carriage 34 at right angles to the ways 37 formed on the base 33. The carriage 35 also includes a depending bracket 75 (Fig. 2) rigidly fixed to it by screws 76. A connecting rod 77 is rigidly bolted to the bracket 75 by nut 78 and it extends into a cylinder 79 within a housing 80. A piston 81 is connected to the end of rod 77 opposite that connected to the bracket 75 and is adapted to be reciprocated within the cylinder 79. The line 46 that supplies liquid to the cylinder 42 is connected to a main supply line 82, including a conventional relief valve, that also delivers liquid under pressure through a flexible tube 83 to a duct 84 within the carriage 34. The duct 84 is in communication with the righthand end of the cylinder 79, as viewed in Figure 2, and supplies liquid under pressure thereto for moving the piston 81 leftwardly. The lefthand end of the cylinder 79 is provided with an exhaust port 85 that also acts as an air vent. The housing 80 also includes a plurality of additional cylinders 86 similar to the cylinders 49 of Figure 4. A floating piston 87, identical with pistons 50, is adapted to be reciprocated within cylinders 86 and to cooperate with a datum plate 86' similar to the datum plate 51 for the carriage 34. There is a screw 87' for each cylinder 86 which is adjustably threaded into the bracket 75 for cooperation with its respective floating piston 87. There may be any number of cylinders 86 and screws 87', although it has been found practical to employ a lesser number than is required of the cylinders 49. In the present instance, there is shown a series of nine cylinders 86, each of which includes a floating piston 87 identical with the pistons 50. The pressure and area relations of the cylinders 79, 86 and pistons 81, 87 are identical with those of cylinders 42, 49 and pistons 45 and 50. Each of the cylinders 86 includes a duct 88 that communicates with a passage 89 within a manifold 90. The passages 89 are arranged in a circle and are adapted successively and selectively to be supplied with liquid under pressure from a valve 91 (Figs. 2 and 8) that is similar to the valve 61. The valve 91 is adapted to be rotated by a handwheel 92 in the same manner that valve 61 is rotated by the handwheel 67. Liquid under pressure is adapted to be supplied to the valve 91 by a duct 93 in the same manner that valve 61 is supplied from duct 70. In other words, the specific construction of the valves 91 and 61, together with their attending parts, is substantially identical. The handwheels 92 and 63 are each provided with spring-pressed detents 94 for locating the valves 91 and 61 in cooperating position with each of the ducts 89 and 59 respectively. Fixed and movable vernier scales 95 and 96 (Figs. 1, 2 and 3) are also provided for facilitating the accurate adjustment of carriage 35 along its ways 74 in the same way that vernier scales 53', 53" aid the adjustment of carriage 34. The details of the vernier scales are shown in Figure 3. They are of the usual construction wherein the operator may locate the carriages 34 and 35 within a thousandth of an inch.

In order to maintain the screws 87' and 53 in accurate adjusted position, a resiliently-operated friction device is provided for each screw. Referring to Figure 5 wherein the device is shown as applied to the screws 53, separate nuts 97 are threaded onto the screws 53 into engagement with springs 98 that rest within recesses 99 of the bracket 38. Semi-circular notches 100 (Fig. 2) are provided between adjacent nuts 97 for slidingly receiving the end of a stud 101 (Fig. 5) that is threaded into the bracket 38. The springs 99 resiliently urge the nuts 97 and consequently the screws 53 rightwardly, thereby taking up any backlash between the threads and the member 38 in which the screws 53 are threaded. The nuts 97 are prevented from rotating by the studs 101 and the friction created by the springs 99 prevents the inadvertent rotation of the screws 53 due to vibrations of the machine.

In operation, the saddle 22 is located high enough so that work can conveniently be mounted on the table 35. The spindle 28 is fixed along the arm 25 and a fixture is rigidly attached to the carriage 35 to properly locate the work that is to be machined. The work is rigidly bolted to the carriage 35. With the pressure liquid acting on the pistons 45, 81 and upon the pistons 50, 87 for any desired corresponding positions of the valves 61 and 91, the operator, by adjusting the screws 53 and 87' for the selected cylinders 49 and 86, can locate the table 35 and the work supported by it with the aid of the vernier scales 53', 53", 95 and 96 so that upon downward feeding of the spindle 28, the machining will be accurately accomplished. This, the operator will do successively for each location of the work where a desired machining operation is to be accomplished until all operations have been accomplished that are to be performed by the spindle 28 within a cycle of operation and regardless of the required tool in the spindle 28. Succeeding pieces of work need merely be rigidly fixed to the carriage 35 against the locating fixture and the handwheels 67 and 92 properly operated to locate the work for all of the operations desired to be performed on the suceeding work pieces. Furthermore, the desired order of performing the operations may be at the will of the operator regardless of where the carriage 35 may be, or the paths along which it is to be moved for locating the work to accomplish the various machining operations.

Although the various features of the new and improved positioning device have been shown and described in detail to fully disclose one embodiment of the invention, it will be evident that nu-

What is claimed is:

1. Apparatus comprising in combination, a member adapted to be moved along a plurality of paths at substantially right angles to each other; yieldable, oppositely-acting means adapted to move said member to, and hold it at any desired point along each of its paths of motion; adjustable means for accurately locating a plurality of points along said paths to any one at a time of which said member is adapted to be moved, and held; and means adapted to be moved non-proportionately relatively to the movement of said member and to a plurality of positions, one for each of said different points along said paths for causing said member to be moved to, and held at said different points along said paths of motion.

2. Apparatus comprising in combination, a member adapted to be moved along a rectilinear path; a device mounted on said member and adapted to be moved along a rectilinear path at substantially right angles to the path of movement of said member; fluid-operated means adapted to set up a condition of fluid stable equilibrium of said member and device at a plurality of pre-determined points along their respective paths of motion; adjustable means for accurately locating the point along said paths at which said condition of fluid stable equilibrium of said member and device is adapted to exist; separate elements for said member and device adapted to be moved non-proportionately relatively to the movement of its respective member and device; and means for moving said elements to a plurality of positions, one for each of said different points along said paths for causing the condition of fluid stable equilibrium for its corresponding point to become effective.

3. Apparatus comprising in combination, a member adapted to be moved along a rectilinear path; a device mounted on said member and adapted to be moved along a rectilinear path at substantially right angles to the path of movement of said member; a plurality of separate fluid-operated means for each said member and device, adapted to set up a condition of fluid stable equilibrium of said member and device at different points along their respective paths; separate adjustable elements associated with said separate means for accurately locating the points along said paths at which said condition of fluid stable equilibrium of said member and device is adapted to exist; and means for selectively rendering effective said separate means.

4. In an apparatus including a member adapted to be moved in either direction along a path; a fluid-operated differential piston device for locating said member at a plurality of points along said path comprising in combination, one piston for moving said member in one direction along its path of movement; a plurality of floating pistons adapted to be moved substantially throughout the extent of movement of said one piston; means for applying a fluid pressure force to one side of said one piston; means for selectively applying a greater fluid pressure force to one side of any floating piston to move it in an opposite direction from that of the movement of said one piston while connecting all other floating pistons to an exhaust; means for limiting the extent of movement of said floating pistons; and a plurality of adjustable elements attached to said member, one for each of said floating pistons and each adapted to abut against its respective floating piston at said limiting means.

5. In an apparatus including a member adapted to be moved in either direction along a rectilinear path; a device mounted on said member and adapted to be moved along a rectilinear path at substantially right angles to the path of movement of said member; separate fluid-operated differential piston devices for locating said member and device at a plurality of points along the respective paths comprising in combination, separate pistons for moving said member and device in one direction along their respective paths of movement; a plurality of floating pistons for said member and device, each adapted to be moved substantially throughout the extent of movement of its respective separate piston; means for applying a fluid pressure force against one side of said separate pistons; means for selectively applying a greater fluid-pressure force to one side of any floating piston to move it in an opposite direction from that of the movement of its respective separate piston while connecting to exhaust all other floating pistons associated with its separate piston; means for limiting the extent of movement of said floating pistons; and a plurality of adjustable elements for each said member and device, one for each of the floating pistons and each adapted to abut against its respective floating piston at said limiting means.

6. Apparatus comprising in combination, a member adapted to be moved in either direction along a path; means for exerting a continuous yieldable force to move said member in one direction along said path; a plurality of means, each adapted to be moved an amount proportional to the travel of said member; means adapted to exert a greater yieldable force than said continuous force selectively to move each of said movable means to the one extremity of its movement; and a plurality of screws attached to, and adjustable throughout the extent of the travel of said member, one for each of said movable means and each adapted to abut its corresponding movable means when said greater force acts thereupon.

7. Apparatus comprising in combination, a member adapted to be moved in either direction along a plurality of paths; separate yieldable means for exerting a continuous force to move said member in one direction along each of its paths; a plurality of means for each path of movement of said member, each adapted yieldably to be moved an amount proportional to the travel of said member; means adapted to exert a greater force than said continuous force selectively to move each of said movable means to the one extremity of its movement; and a plurality of screws for each path of movement of said member, attached to and adjustable throughout the extent of travel of said member along said paths, one for each of said movable means, and each adapted to abut its corresponding movable means when said greater force acts thereupon.

8. In a machine tool, a member adapted to be moved in either direction along a straight path; means adapted to be rendered continuously effective to exert a constant force at any point along said path for moving said member in one direction therealong; a plurality of auxiliary means of identical design, each adapted to exert a constant force greater than that of said continuously-effective means at any point along said path for moving said member therealong in a direction opposite that caused by said continuously-effective means; separate independent means for limiting the action of each of said auxiliary means; a plurality of means, one for each of said auxiliary means and each having a range of activity throughout the entire extent of the stroke of said member for changing the relationship between the movable member and said limiting means; and means for rendering any one of said auxiliary means operative and all others inoperative.

9. Apparatus comprising in combination, a member adapted to be moved in either direction along a path; means adapted to be rendered continuously effective to move said member in one direction throughout any desired stroke along said path, said means being adapted to exert a constant force at any point within the total extent of said stroke; a plurality of independent means of substantially identical design, whereby their number may be limitless, each adapted to move said member along said path throughout its stroke in a direction opposite that caused by said continuously-effective means, each of said substantially identical means being adapted to exert a constant force greater than that of said continuously-effective means at any point within the stroke of said member; separate means, independent of each other, for limiting the stroke of each of said substantially identical means; a plurality of means, one for each of said limiting means, for adjusting the relationship between said member and said limiting means and effective throughout the entire stroke of said member; and means for rendering any one of the substantially identical means operative and all others inoperative.

10. In an apparatus, a member adapted to be moved along a path; a plurality of pre-settable means, one for each of a plurality of locations along said path to which said member is adapted to be moved and held; means adapted to be rendered continuously effective to move said member in one direction along said path, said means being adapted to exert a constant force at any point within the total extent of said path; a plurality of auxiliary means of substantially identical design, one for each of said plurality of pre-settable means, each adapted to exert a constant force greater than that of said continuously-effective means; a plurality of means, independent of each other and one for each of said pre-settable means, adapted to limit the action of the auxiliary means; and means operable at will for rendering operative any one of said pre-settable means and rendering all others inoperative.

11. In a machine tool, a member adapted to be moved in either direction along a straight path; fluid pressure means adapted to be rendered continuously effective to move said member in one direction along said path; more than three auxiliary fluid-operattd means of substantially identical design, each adapted to exert a greater force than said continuously-effective means for moving said member in the opposite direction along said path; separate independent means for limiting the action of each of said auxiliary means; a plurality of means, one for each of said auxiliary means and each having a range of activity throughout the entire extent of the stroke of said member for changing the relationship between the member and said limiting means; and means for rendering any one of said auxiliary means operative and all other inoperative.

12. Apparatus comprising in combination, a member adapted to be moved in either direction along a straight path; constant fluid-pressure means adapted to be rendered continuously effective for moving said member in one direction throughout any desired stroke along said path; more than three independent constant fluid-pressure means of substantially identical design, whereby their number may be limitless, each adapted to move said member along said path throughout its stroke in a direction opposite that caused by said continuously-effective fluid-operated means; separate means, independent of each other, for limiting the stroke of each of said substantially identically-designed means; a plurality of means, one for each of said limiting means, and effective throughout the entire stroke of said member for adjusting the relationship between said member and said limiting means; and means for rendering any one of said substantially identically-designed means operative and all others inoperative.

13. In an apparatus, a member adapted to be moved along a straight path; a plurality of means, one for each of a plurality of locations along said path to which said member is adapted to be moved and held, and each having a presettable range extending throughout the length of said path; constant fluid-pressure means adapted to be rendered continuously effective for moving said member in one direction throughout the extent of said path; a plurality of constant fluid-pressure means of substantially identical design, one for each of said pre-settable means and each adapted to exert a greater force than that of said continuously-effective fluid-pressure means for moving said member along said path in a direction opposite that caused by said continuously- effective means; a plurality of means, independent of each other and one for each of said presettable means, adapted to limit the action of the identically-designed means; and means operable at will for rendering operative any one of said pre-settable means and rendering all others inoperative.

14. In a machine tool, a support; means for moving said support in one direction throughout any desired stroke along a path, said means being adapted to be rendered continuously effective to exert a constant force at any point within the total extent of said stroke; a plurality of means of substantially identical design, each adapted to move said movable support along said path throughout its stroke in a direction opposite that caused by said continuously-effective means, said identically-designed means being adapted to exert a constant force greater than that of said continuously-effective means at any point within the stroke of said movable support; means for limiting the action of said identically-designed means; means for adjusting the relationship between said movable support and said limiting means; and means for rendering any one of said identically-designed means operative and all others inoperative.

15. In a machine tool, a support; constant fluid-pressure means adapted to be rendered continuously effective for moving said support in one direction throughout any desired stroke along a path; a plurality of auxiliary constant fluid-pressure means, each adapted to exert a greater force than said continuously-effective fluid-pressure means for moving said movable support along said path throughout its stroke in a direction opposite that caused by said continuously-effective fluid-pressure means; separate independent means for limiting the action of said auxiliary means; a plurality of independent means, one for each of said auxiliary means and each having a range of operation extending throughout the extent of the stroke of said movable support for adjusting the relationship between said movable support and said limiting means; and means for rendering operative any one of said auxiliary means and all others inoperative.

16. In a machine tool, a frame; a member mounted on said frame for movement along a path; a support mounted on said member for movement along a path at substantially right angles to the path of movement of said member; separate means adapted to be rendered continuously effective for moving said member and support in one direction throughout any desired stroke along their respective paths, said separate means being adapted to exert a constant force at any point within the total extent of said strokes; a plurality of auxiliary means for said member and support, each respectively adapted to move the member and support along their respective paths throughout their respective strokes in a direction opposite that caused by said separate means, said auxiliary means being adapted to exert a constant force greater than its respective separate means at any point within the respective strokes of said member and support; means for limiting the action of said auxiliary means; means for adjusting the relationship between said member and support and their respective limiting means; and means for rendering any one of said auxiliary means for said member and support operative and all others therefor inoperative.

17. In a machine tool, a frame; a member mounted on said frame for movement along a path; a support mounted on said member for movement along a path at substantially right angles to the path of movement of said member; separate constant fluid-pressure means adapted to be rendered continuously effective for moving said member and support in one direction throughout any desired stroke along their respective paths; a plurality of auxiliary constant fluid-pressure means for said member and support, each adapted to exert a force greater than its respective continuously-effective fluid-pressure means for moving said member and support along their respective paths in a direction opposite that caused by said continuously-effective fluid-pressure means; means for limiting the action of said auxiliary means; means for adjusting the relationship between said member and support and their respective limiting means; and means for rendering any one of said auxiliary means for said member and support operative and all others therefor inoperative.

18. In a machine tool, a member adapted to be moved in either direction along a straight path; constant fluid-pressure means for moving said member in one direction throughout any desired stroke along said path; more than three constant fluid-pressure means of substantially identical design, whereby their number may be limitless, adapted to exert a greater force than said first-mentioned fluid-pressure means for moving said member in an opposite direction along said path; separate means, independent of each other, for limiting the action of said substantially identically-designed means; means effective throughout the entire stroke of said member for adjusting the relationship of the movable member and said limiting means; and means for rendering any one of said identically-designed means operative and all others inoperative.

19. In a machine tool, a support; a master piston associated with said support and adapted to be reciprocated within a cylinder; a source of fluid under substantially constant pressure adapted continuously to be supplied to the one face of said master piston to urge said support in one direction along a path; a plurality of floating pistons each having an effective area greater than that of the master piston for urging said support in the opposite direction along said path; a cylinder for each of said floating pistons; a plurality of threaded openings associated with said support, one for each of said floating pistons and each aligned with its corresponding floating piston; a screw in each opening; an annular member at the end of the cylinder of each of said floating pistons adjacent to said screws for facilitating cooperation between said screws and their corresponding floating pistons while retaining said floating pistons within said cylinder; and a distributing valve for selectively admitting said fluid to the ends of the cylinders containing said floating pistons opposite those adjacent to said screws.

20. In a machine tool, a holder; a support for said holder; separate master pistons associated with said support and said holder, each adapted to be reciprocated within a cylinder; a source of fluid under substantially constant pressure adapted continuously to be supplied to the one face of said master pistons to urge said support and holder in one direction along intersecting paths; a plurality of floating pistons for said support and holder, each having an effective area greater than that of its corresponding master piston; a cylinder for each of said floating pistons; a plurality of screws for said support and holder, one for each of its floating pistons and each aligned with its corresponding floating piston; an annular member at the ends of the cylinders for said floating pistons adjacent to said screws for facilitating cooperation between said screws and their corresponding floating pistons while retaining said floating pistons within said cylinders; and separate distributor valves for said support and holder for selectively admitting said fluid to the ends of the cylinders containing said floating pistons opposite those adjacent to said screws.

21. In a machine tool, a support movable in a straight-line path of travel; a master piston connected to said support and adapted to be reciprocated within a master cylinder; means for supplying fluid under a predetermined pressure continuously to one face of said master piston to urge said support in one direction along said path; a plurality of floating pistons each having an effective area greater than that of the master piston; a plurality of rods connected to said support for individual lengthwise adjustment relative thereto in directions parallel to the directions of movement of said floating pistons, there being a rod aligned with each of said floating pistons; a cylinder for each of said floating pistons, one end of each of said cylinders being provided with stop means for retaining the floating piston therein and an opening for freely receiving the corresponding rod for abutment with said floating piston; a plurality of conduits, one for each of said floating piston cylinders and each connected to the end of the corresponding cylinder opposite said one end; and a distributing valve for selectively admitting said fluid under said predetermined pressure to any one of said conduits to urge the piston in the selected cylinder against the said stop means whereby abutment between said piston and the corresponding rod causes said support to assume a definite position within its path of travel determined by the adjustment of said rod.

22. In a machine tool, a support movable in a straight-line path of travel; a master piston connected to said support and adapted to be reciprocated within a master cylinder; means for supplying fluid under a predetermined pressure continuously to one face of said master piston to urge said support in one direction along said path; a plurality of floating pistons each having an effective area greater than that of the master piston; a plurality of plunger rods connected to said support for individual lengthwise adjustment relative thereto in directions parallel to the directions of movement of said floating pistons, there being a rod aligned with each of said floating pistons; a cylinder for each of said floating pistons, one end of each of said cylinders being provided with stop means for retaining the floating piston therein and an opening for freely receiving the corresponding rod for abutment with said floating piston; and a distributing valve for selectively admitting said fluid under said predetermined pressure to the end of any one of said floating piston cylinders opposite said one end to urge the piston in the selected cylinder against the said stop means whereby abutment between said piston and the corresponding plunger causes said support to assume a definite position within its path of travel determined by the adjustment of said plunger.

23. Apparatus comprising in combination, a member; a source of power for moving said member in either direction along a rectilinear path of movement; at least three separate means of substantially identical design, each for determining a location to which said member is desired to be moved, said location being anywhere throughout the entire length of said rectilinear path; means for selecting at any instant any one of said locations to which said member is desired to be moved; and means cooperable with said selecting and determining means for moving said member along the shortest path to said selected location.

24. In a machine tool, a support; a source of power for moving said support along a rectilinear path; separate means of substantially identical design for determining at least three locations to which said support is desired to be moved, said locations being anywhere throughout the entire length of said rectilinear path; means for selecting at any instant any one of said locations; and means cooperable with said selecting and determining means for moving said support along the shortest path to establish said selected location.

25. Apparatus comprising in combination, a member adapted to be moved along a rectilinear path; oppositely-acting fluid-operated means adapted to move said member to, and hold it at any one, at a time, of more than three locations along its path of motion; separate adjustable means for each of said more than three locations, effective over the entire path of travel of said member and independent of each other for accurately locating each of said more than three locations to which said member is adapted to be moved and held; and an element adapted to be moved non-proportionately relatively to the movement of said member and to a plurality of positions, one for each of said more than three locations for causing said member to be moved to, and held at said locations.

26. Apparatus comprising in combination, a support adapted to be moved in either direction along a rectilinear path; separate abutment elements, independent of each other, for each of more than three locations to which said support is desired to be moved, each having an effective portion adapted to be adjusted to any predetermined point throughout the extent of said rectilinear path; a distributor for selectively rendering effective one of said abutment elements and for rendering ineffective all others; and hydraulically-operated piston mechanism cooperable with said distributor for causing said support initially to move toward the location selected by the operation of said distributor, regardless of the previous location of said support, and cooperable with the corresponding abutment element to stop said member at said selected location.

27. In a machine tool, a support adapted to be moved in either direction along a rectilinear path; separate abutment elements, independent of each other, for each of three or more locations to which said support is desired to be moved, each having an effective portion adapted to be adjusted to any predetermined point throughout the extent of said rectilinear path; a distributor for selectively rendering effective one of said abutment elements and for rendering ineffective all others; and power-supplying mechanism cooperable with said distributor for causing said support initially to move toward the location selected by the operation of said distributor regardless of the previous location of said support, and cooperable with the corresponding abutment element to stop said support at said selected location.

28. In a machine tool, a frame; a base mounted on said frame and adapted to be moved in either direction along a rectilinear path; a support mounted on said base and adapted to be moved in either direction along a rectilinear path at substantially right angles to the path of movement of said base; separate abutment elements for said base and support for each of three or more locations to which said base and support are desired to be moved along their respective paths; each of said abutment elements having an effective portion adapted to be adjusted to any predetermined point throughout the extent of the path of movement of its corresponding base or support; separate distributors for said base and support for selectively rendering effective one of said abutment elements for said base and support and for rendering ineffective all others; and power-supplying mechanism cooperable with said distributors for causing said base and support initially to move toward the locations selected by the operation of their distributors regardless of the previous location of said base and support, and cooperable with the corresponding abutment elements to stop said base and support at the selected locations along their respective paths.

29. In a machine tool, a frame; a base mounted on said frame and adapted to be moved in either direction along a rectilinear path; a support mounted on said base and adapted to be moved in either direction along a rectilinear path at substantially right angles to the path of movement of said base; separate abutment elements for said base and support for each of three or more locations to which said base and support are desired to be moved along their respective paths; each of said abutment elements having an effective portion adapted to be adjusted to any predetermined point throughout the extent of the path of movement of its corresponding base or support; separate distributors for said base and support for selectively rendering effective one of said abutment elements for said base and support and for rendering ineffective all others; and hydraulically-operated piston mechanism cooperable with said distributors for causing said base and support initially to move toward the locations selected by the operation of their distributors regardless of the previous location of said base and support, and cooperable with the corresponding abutment elements to stop said base and support at the selected locations along their respective paths.

30. Apparatus comprising in combination, a member adapted to be moved in either direction along a rectilinear path; separate abutment elements, independent of each other, for each of three or more locations to which said member is desired to be moved, each having an effective portion adapted to be adjusted to any predetermined point throughout the extent of said rectilinear path; a distributor for selectively rendering effective one of said abutment elements and for rendering ineffective all others; and power-supplying mechanism cooperable with said distributor for causing said member initially to move toward the location selected by the operation of said distributor regardless of the previous location of said member, and cooperable with the corresponding abutment element to stop said member at said selected location.

31. Apparatus comprising in combination, a frame; a base mounted on said frame and adapted to be moved in either direction along a rectilinear path; a member mounted on said base and adapted to be moved in either direction along a rectilinear path at substantially right angles to the path of movement of said base; separate abutment elements for said base and member for each of three or more locations to which said base and member are desired to be moved along their respective paths; each of said abutment elements having an effective portion adapted to be adjusted to any predetermined point throughout the extent of the path of movement of its corresponding base or member; separate distributors for said base and member for selectively rendering effective one of said abutment elements for said base and member and for rendering ineffective all others; and power-supplying mechanism cooperable with said distributors for causing said base and member initially to move toward the locations selected by the operation of their distributors regardless of the previous location of said base and member, and cooperable with the corresponding abutment elements to stop said base and member at the selected locations along their respective paths.

EDWARD P. BULLARD, III.

REFERENCES CITED

The following references are of record in the file of this patent:

UNITED STATES PATENTS

| Number | Name | Date |
|---|---|---|
| 1,396,302 | Wagner | Nov. 8, 1921 |
| 1,920,596 | Schafer | Aug. 1, 1933 |
| 1,956,110 | Turrettini | Apr. 24, 1934 |
| 2,005,822 | Burrell | June 25, 1935 |
| 2,068,199 | Seletsky | Jan. 19, 1937 |
| 2,165,226 | Collins | July 11, 1939 |
| 2,234,009 | Robinson | Mar. 4, 1941 |
| 2,239,882 | Davis | Apr. 29, 1941 |
| 2,310,720 | Wandrey | Feb. 9, 1943 |
| 2,352,183 | Bullard, 3rd | June 27, 1944 |
| 2,370,286 | Berger | Feb. 27, 1945 |
| 2,391,470 | May | Dec. 25, 1945 |